United States Patent [19]

Goldstein

[11] Patent Number: 5,048,056
[45] Date of Patent: Sep. 10, 1991

[54] METHOD AND APPARATUS FOR MAPPING AN EIGHT DIMENSIONAL CONSTELLATION OF A CONVOLUTIONALLY CODED COMMUNICATION SYSTEM

[75] Inventor: Yuri Goldstein, Southbury, Conn.

[73] Assignee: General DataComm, Inc., Middlebury, Conn.

[21] Appl. No.: 535,329

[22] Filed: Jun. 8, 1990

[51] Int. Cl.$^5$ .................. H04L 5/12; H03M 7/00
[52] U.S. Cl. ........................ 375/39; 375/42; 371/43
[58] Field of Search ............ 375/39, 42, 27, 54, 375/57; 371/43; 332/103, 104

[56] References Cited

U.S. PATENT DOCUMENTS

| | | | |
|---|---|---|---|
| 3,665,396 | 5/1972 | Forney, Jr. | 371/43 |
| 3,806,647 | 4/1974 | Dohne et al. | 375/54 |
| 3,887,768 | 6/1975 | Forney, Jr. et al. | 375/39 |
| 3,955,141 | 5/1976 | Lyon | 375/39 |
| 4,032,886 | 6/1977 | En et al. | 371/45 |
| 4,084,137 | 4/1978 | Welti | 375/38 |
| 4,283,786 | 8/1981 | Okamura | 375/34 |
| 4,291,406 | 9/1981 | Bahl et al. | 371/45 |
| 4,312,069 | 1/1982 | Ahamed | 371/37 |
| 4,312,070 | 1/1982 | Coombes | 371/45 |
| 4,404,532 | 9/1983 | Welti | 332/17 |
| 4,442,530 | 4/1984 | Parrish, Jr. et al. | 375/67 |
| 4,447,908 | 5/1984 | Chevillat et al. | 375/42 |
| 4,457,004 | 6/1984 | Gersho | 375/67 |
| 4,483,012 | 11/1984 | Wei | 375/27 |
| 4,493,082 | 1/1985 | Cumberton et al. | 371/43 |
| 4,520,490 | 5/1985 | Wei | 375/27 |
| 4,527,279 | 7/1985 | Yasuda et al. | 375/114 |
| 4,581,601 | 4/1986 | Calderbank et al. | 375/94 |
| 4,583,236 | 4/1986 | Kromer et al. | 375/17 |
| 4,586,182 | 4/1986 | Gallager | 371/30 |
| 4,597,090 | 6/1986 | Forney, Jr. | 375/39 |
| 4,601,044 | 7/1986 | Kromer, III et al. | 375/17 |
| 4,641,327 | 2/1987 | Wei | 375/114 |
| 4,700,349 | 10/1987 | Gallager | 371/30 |
| 4,713,817 | 12/1987 | Wei | 371/43 |
| 4,748,626 | 5/1988 | Wong | 375/39 |
| 4,807,230 | 2/1989 | Srinvasagopalan et al. | 375/114 |
| 4,809,300 | 2/1989 | Goldstein et al. | 375/94 |

OTHER PUBLICATIONS

"A Coherent Digital Amplitude and Phase Modulation Scheme", by C. N. Campopiano and B. B. Glazer; IRE Transactions on Communications Systems: pp. 90–95; Mar. 1962.

(List continued on next page.)

Primary Examiner—Benedict V. Safourek
Assistant Examiner—Young Tse
Attorney, Agent, or Firm—David P. Gordon

[57] ABSTRACT

A mapping technique for an 8D, sixty-four state convolutionally coded 19.2 Kbit/second modem utilizes twenty-nine bits for defining all points of an 8D constellation. The 8D constellation which is mapped is comprised of a desired subset of a concatenation of four 2D constellations, where each 2D constellation has one hundred sixty points. The mapping technique generally comprises: dividing each 2D constellation into five different energy groups of thirty-two points each, the concatenation of four groups, one from each 2D constellation, comprising an 8D grouping; choosing five hundred twelve 8D groupings from the possible six hundred twenty-five ($5^4$) 8D groupings available; partitioning each group of thirty-two points into four subgroups, three of the subgroups of any particular group being ninety, one hundred eighty, and two hundred seventy degree roations of a first subgroup of the particular group; and defining each 8D point in the 8D constellation by using nine bits to choose the 8D grouping, eight bits to choose four subgroups in the 8D grouping, one for each 2D constellation, and twelve bits to choose four 2D points, one in each chosen subgroup, the four 2D points comprising the 8D point. The chosen five hundred twelve 8D groups are preferably the lowest energy 8D groupings of the six hundred twenty-five possible 8D groupings.

12 Claims, 2 Drawing Sheets

OTHER PUBLICATIONS

"Fast Quantizing and Decoding Algorithms for Lattice Quantizers and Codes", by Conway and Sloane; IEEE Transactions on Information Theory; pp. 227–232; Mar. 1982.

"Principles of Digital Communication and Coding", by Viterbi and Omura, McGraw-Hill, Inc. 1979; pp. 258–261.

"Jointly Adaptive Equalization and Carrier Recovery in Two-Dimensional Digital Communication Systems", by D. D. Falconer; The Bell System Technical Journal, Mar. 1976; pp. 317–334.

"Rotationally Invariant Convolutional Channel Coding with Expanded Signal Space-Part I"; 180°; by Lee-–Fang Wei; 1984 IEEE Journal of Selected Areas in Communications; Sep. 1984; pp. 659–686.

Channel Coding with Multilevel/Phase Signals by G. Ungerboeck; IEEE Transactions on Information Theory, Jan. 1982; pp. 55–67.

"Four-Dimensional Modulation with an Eight-State Trellis Code", by Calderbank and Sloane; AT&T Technical Journal, May–Jun. 1985, pp. 1005–1018.

"Four-Dimensionally Coded PSK Systems for Combatting Effects of Severe ISI and CCI", by R. Fang, Comsat Laboratories and W. Lee, M.I.T., pp. 1032–1038.

"A New Family of Codes for Dial-Up Voice Lines", by Calderbank and Sloane; AT&T Bell Laboratories, pp. 673–676.

"Four-Dimensional Modulation and Coding: An Alternate to Frequency-Reuse", by Wilson, Sleeper and Srinath; Univ. of Virginia, Oct. 83.

"Four-Dimensional Modulation and Coding: An Alternate to Frequency-Reuse", Grant No. NAG3-141; Report No. UVA/52800/EE83/107, Sep. 1983; by Wilson and Sleeper.

"Efficient Modulation for Band-Limited Channels", by Forney, Gallager, Lang, Longstaff and Qureshi; Jour. on Selected Areas in Communications, vol. Sac-2, No. 5, Sep. 1984, pp. 632–647.

5,048,056

METHOD AND APPARATUS FOR MAPPING AN EIGHT DIMENSIONAL CONSTELLATION OF A CONVOLUTIONALLY CODED COMMUNICATION SYSTEM

BACKGROUND OF THE INVENTION

This invention relates to techniques for mapping a stream of information bits sent over a channel in a plurality of signaling slots to the points of an eight dimensional (8D) signal constellation. This invention more particularly relates to mapping techniques for defining the points of an 8D constellation through the use of twenty-nine bits.

An eight-dimensional, sixty-four state convolutionally coded communication system for transmitting information is disclosed in U.S. Pat. No. 4,713,817 to Wei which is hereby incorporated by reference herein. With such a system, Wei teaches how to construct a 19.2 Kbit/second modem which utilizes four 2D constellations, each having one hundred sixty points. Although Wei claims an eight dimensional constellation which is comprised of a concatenation of the four 160 points 2D constellations (e.g. a constellation having $160^4$ points), Wei teaches (at Col. 17, lines 57–65) that 536,870,912 points of the 655,360,000 8D points are chosen, and that twenty-nine bits are used to represent those 536,870,912 points. In particular, in accord with the teachings of U.S. Pat. No. 4,597,090 to Forney, Jr., Wei teaches that each of the four 2D constellations should be divided into a group of inner points, and a group of outer points, each outer point being further from the origin than each of the inner points. In the one hundred sixty point 2D constellation, Wei provides one hundred twenty-eight inner points, and thirty-two outer points. Wei then teaches that the 536,870,912 8D points chosen should include only those 8D points having four inner points or three inner points and one outer point distributed over the four 2D constellations.

In representing the 536,870,912 8D points with twenty-nine bits, Wei effectively divides each group of one hundred twenty-eight inner 2D points into four rotational subgroups of thirty-two points each, and each group of thirty-two outer 2D points into four rotational subgroups of eight point each. In choosing (mapping) a point, Wei first uses one bit to indicate whether 8D point has all inner points, or three inner points and one outer point. If the 8D point has all inner points, eight additional bits, two for each 2D constellation, are used to indicate in which of the four rotational subgroups the chosen point is located. The remaining twenty bits (five per 2D constellation) are used to identify the particular point out of the thirty-two points of the rotational subgroup for each 2D constellation. Where the 8D point has an outer point as identified by a first bit, eight additional bits are still used to identify the rotational subgroups. For the inner points, five bits per 2D constellation (total of fifteen) are still utilized to identify the points. However, of the remaining five bits, two bits are used to identify from which of the four 2D constellations the outer point is being chosen, and three bits are used to identify which of the eight outer points of an outer rotational subgroup is being sent.

While the Wei patent as disclosed (as opposed to claimed) is effective in providing a 19.2 Kbit/sec modem, the mapping technique utilized is not necessarily optimal or desirable. In particular, the division of each constellation into inner and outer points does not guarantee or approach an optimal signal to noise ratio, as there exist points among those 536,870,912 8D points chosen which have higher energy than some 8D points which would have had two inner and two outer points.

SUMMARY OF THE INVENTION

It is therefore an object of the invention to provide an improved mapping technique for an eight dimensional constellation of a convolutionally coded 19.2 Kbit/sec modem.

It is a further object of the invention to provide an improved mapping technique for a 19.2 Kbit/sec modem which increases the signal to noise performance of the modem.

In accord with the objects of the invention, a mapping technique which utilizes twenty-nine bits for defining all points of an 8D constellation is provided. This 8D constellation is a desired subset of a concatenation of four 2D constellations, where each 2D constellation has one hundred sixty points. The mapping technique generally comprises:

dividing each 2D constellation into five groups of thirty-two points, the concatenation of four groups, one from each 2D constellation, comprising an 8D grouping, choosing five hundred twelve 8D groupings from the possible six hundred twenty-five ($5^4$) 8D groupings available, partitioning each group of thirty-two points into four subgroups, three of the subgroups of any particular group being ninety, one hundred eighty, and two hundred seventy degree rotations of a first subgroup of the particular group; and defining each 8D point in the 8D constellation by using nine bits to choose the 8D grouping, eight bits to choose four subgroups in the 8D grouping, one for each 2D constellation, and twelve bits to choose four 2D points, one in each chosen subgroup, the four 2D points comprising the 8D point.

According to one preferred aspect of the invention, the five groups of thirty-two points of each 2D constellation are chosen such that each group is of substantially different average energy relative to the others. One manner of providing five groups of substantially different energies is to choose a first set of eight points of the 2D constellation of lowest energy which are not ninety, one hundred eighty or two hundred seventy degree rotations of each other ("rotation" being defined throughout as a rotation about a specified origin) and to use those eight points and their 90, 180, and 270 degree rotations as a first group; and then to choose from the remaining points a second set of eight points of lowest energy which are not 90, 180, or 270 degree rotations of each other and to use those eight points and their 90, 180, and 270 degree rotations as a second group, etc. Another manner is to choose the points in a geometric manner such as to define areas which appear to be concentric "circles" or rings.

According to another preferred aspect of the invention, the five hundred twelve eight dimensional groupings are chosen by identifying the five hundred twelve substantially lowest energy eight dimensional groupings of the six hundred twenty-five eight dimensional groupings available.

Additional objects and advantages of the invention will become evident to those skilled in the art upon reference to the detailed description taken in conjunction with the provided figures.

DETAILED DESCRIPTION OF THE PREFERRED EMBODIMENT

Figure 1:
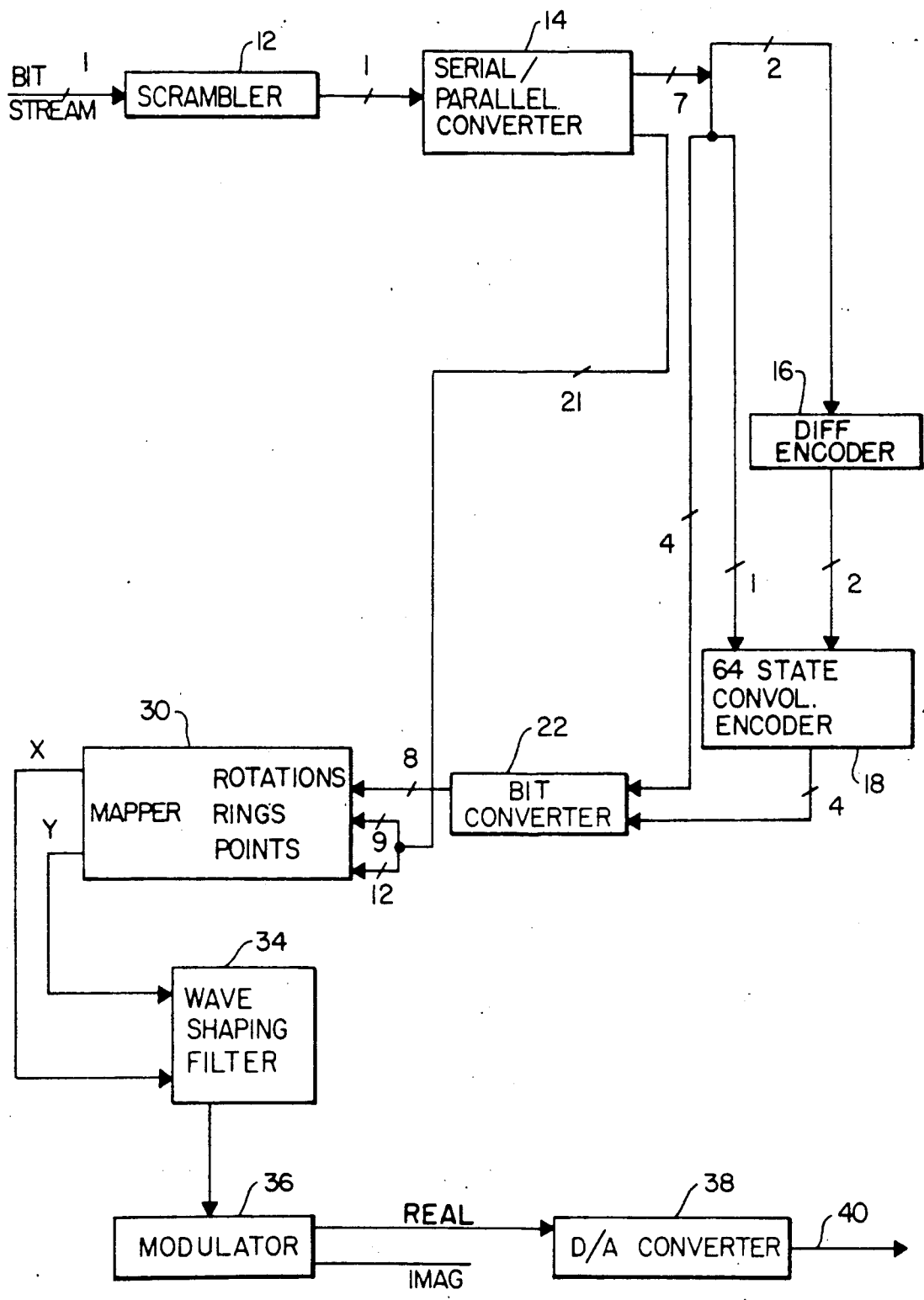
FIG. 1 is a block diagram of a transmitter including an encoder, a bit grouping device, and a mapping table.

Referring to FIG. 1, and in accord with the preferred embodiment, an incoming serial bit stream is scrambled by scrambler 12 and sent to serial-to-parallel converter 14 which generates a twenty-eight bit parallel word. Of the twenty-eight bits, seven of the twenty-eight bits are chosen as described in the aforestated Wei patent. Of the seven bits, two are sent to a differential encoder 16. The two differentially encoded bits along with the third bit of the seven chosen bits are sent to a sixty-four state convolutional encoder 18 which adds one redundant bit indicative of the current state of a finite state device represented by the convolutional encoder. The four convolutionally encoded bits are then sent together with the four remaining chosen bits to a bit converter 22. The bit converter 22 generates eight bits (four sets of two bits) which, as is hereinafter described in more detail, are used to choose in which of four rotational subgroups in each of four 2D constellations a point in the hereinafter described 8D constellation lies. The remaining twenty-one bits which were not chosen for encoding and/or bit converting are used to choose the eight dimensional grouping in which the point in the 8D constellation lies as well as the point itself in the chosen 8D grouping. Thus, all twenty-nine bits are sent to a mapper 30 which takes the twenty-nine bits and generates therefrom four 2D coordinate pairs (four consecutive 2D signal points). The four 2D coordinate pairs are sent serially (one pair per baud) via a shaping filter 34 to a modulator 36 which modulates them onto a carier. The real part of the modulator output is then digital-to-analog converted by D/A converter 38 for transmission over a channel 40.

Figure 2A:
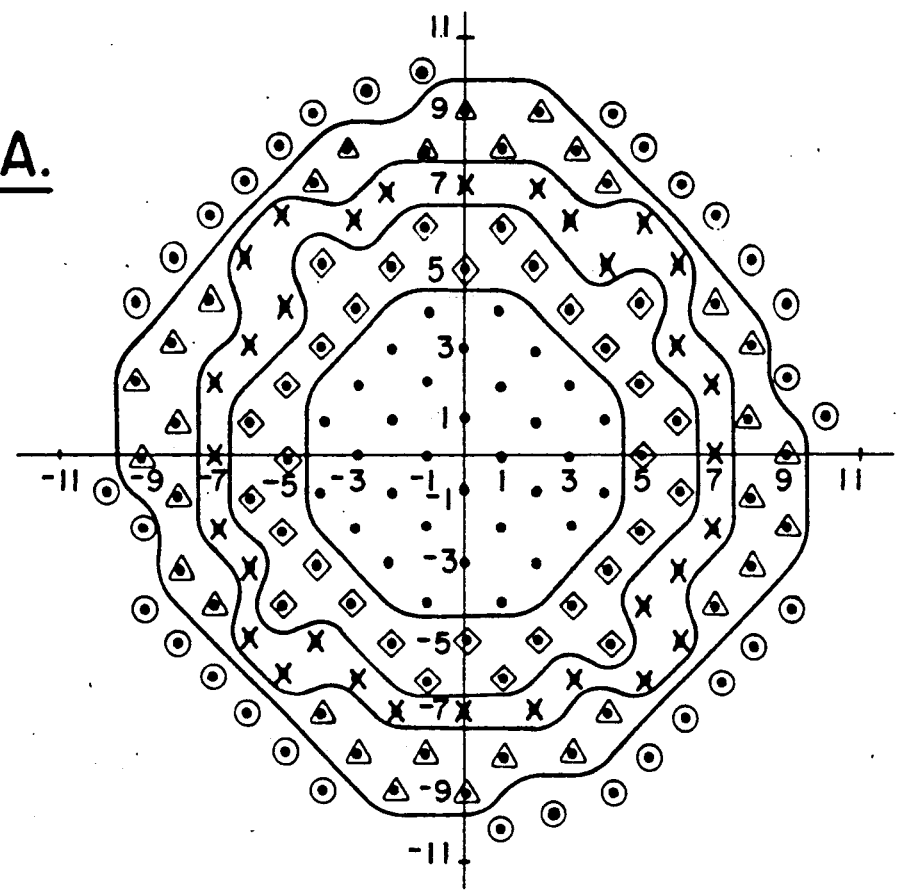
FIGS. 2a and 2b are one hundred sixty point 2D constellations divided into five groups according to first and second embodiments of the invention.
Figure 2B:
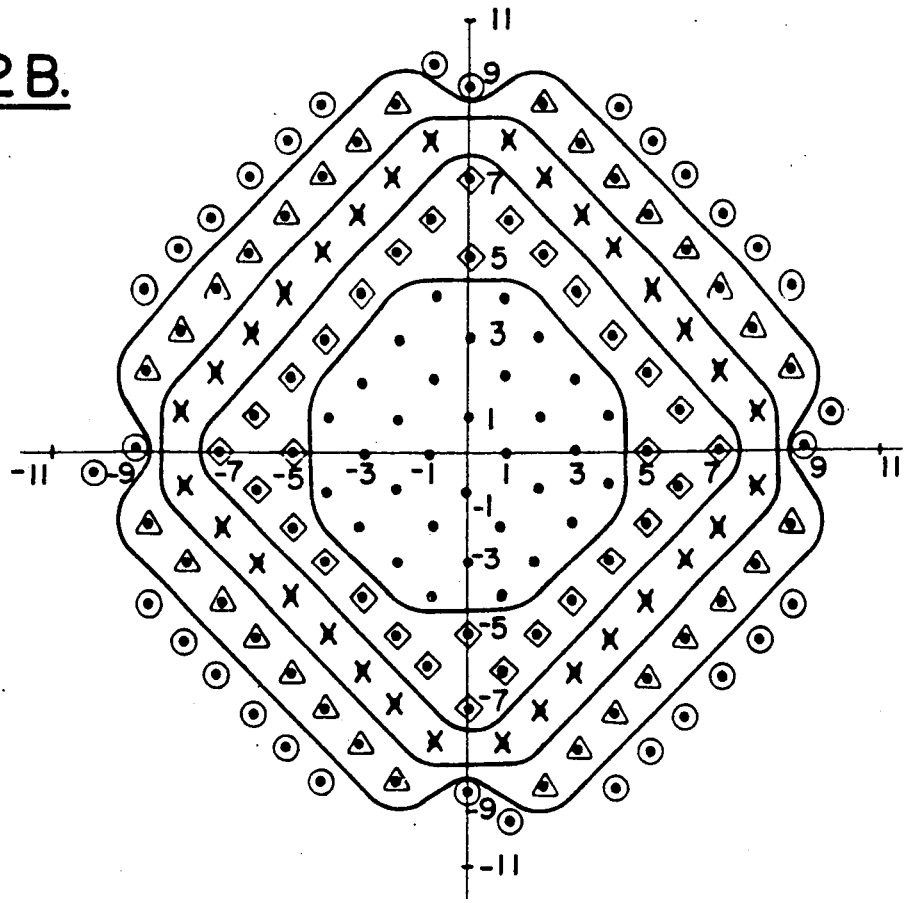

The four 2D coordinate pairs which represent the twenty-nine bits, and which are received at a receiver (not shown) and decoded into the original twenty-eight bits, are chosen from four 2D constellations. Each of the 2D constellations preferably has one hundred sixty points as shown in FIGS. 2a and 2b. With four 160 point constellations, up to 655,360,000 8D points can be represented. However, of the 8D points available, only a subset thereof of 536,870,912 ($2^{29}$) points are used to comprise the 8D constellation of the invention. The 8D points chosen are different than those of the previously referenced Wei patent.

In choosing the $2^{29}$ 8D points, according to a preferred aspect of the invention, each one hundred and sixty point 2D constellation is divided into five groups of thirty-two points each. The five groups are preferably of different average energies and may be chosen in any of several manners. A first manner of choosing five groups of thirty-two points is to choose the set of the eight lowest energy points which are not 90, 180, or 270 degree rotations of each other, and to use those eight points and their 90, 180, and 270 degree rotations as a first group. From the remaining points, a second set of eight lowest energy points which are not 90, 180, or 270 degree rotations of each other are chosen, and those eight points and their 90, 180, and 270 degree rotations are used as a second group. Third, fourth and fifth groups are chosen in the same manner to provide a subdivided constellation as shown in FIG. 2a.

A second manner of choosing five groups of thirty-two points is to divide the constellation geometrically so as to locate each group of points in five areas approximating five concentric "circles" or "rings" around an origin as shown in FIG. 2b. It should be appreciated that the terms "circles" and "rings" are used loosely, as the group of points do not represent an area, but appear to all be located at relatively similar distances from the origin (i.e. they are of similar energies). If the geometric manner of choosing groups is utilized, care still must be taken to guarantee that the 90, 180, and 270 degree rotations of any given point are in the same group as the point. Thus, regardless of the manner of choosing groups, each group may be further subdivided (partitioned) into four subgroups each having eight points, with each subgroup of a given group being defined as representing a 90, 180 or 270 degree rotation of another subgroup of that group. It will be appreciated that partitioning may be accomplished and is a natural result of partitioning an entire 2D constellation into four rotations; the intersection of a rotation and a group defining a subgroup.

With each 2D constellation comprised of five thirty-two point groups, six hundred twenty-five ($5^4$) "8D groupings" exist, with an 8D grouping defined as the Cartesian product of all the points of a given group of the first 2D constellation with all the points of a given group of the second 2D constellation with all the points of a given group of the third 2D constellation with all the points of a given group of the fourth 2D constellation. Because each 8D grouping represents $32^4$ ($=2^{20}$) 8D points, and because only $2^{29}$ points need to be identified, it is evident that only $2^9$ ($=512$) of the six hundred twenty-five 8D groupings need be utilized as part of the 8D constellation. Thus, according to the preferred embodiment, the five hundred twelve lowest energy 8D groupings are utilized. Using the one hundred sixty point constellation divided into the five groups of thirty-two points as shown in FIG. 2b, a listing of those five hundred twelve (0–511) lowest energy 8D groupings by their 2D "rings", and their relative energies is seen in the following chart. The union of these five hundred twelve lowest energy 8D groupings comprises the preferred 8D constellation of the instant invention.

| 0  | 1 | 1 | 1 | 1 | 40.000 |
|----|---|---|---|---|--------|
| 1  | 2 | 1 | 1 | 1 | 62.000 |
| 2  | 1 | 2 | 1 | 1 | 62.000 |
| 3  | 1 | 1 | 2 | 1 | 62.000 |
| 4  | 1 | 1 | 1 | 2 | 62.000 |
| 5  | 3 | 1 | 1 | 1 | 81.000 |
| 6  | 1 | 3 | 1 | 1 | 81.000 |
| 7  | 1 | 1 | 3 | 1 | 81.000 |
| 8  | 1 | 1 | 1 | 3 | 81.000 |
| 9  | 2 | 2 | 1 | 1 | 84.000 |
| 10 | 2 | 1 | 2 | 1 | 84.000 |
| 11 | 2 | 1 | 1 | 2 | 84.000 |
| 12 | 1 | 2 | 2 | 1 | 84.000 |
| 13 | 1 | 2 | 1 | 2 | 84.000 |
| 14 | 1 | 1 | 2 | 2 | 84.000 |
| 15 | 4 | 1 | 1 | 1 | 101.000 |
| 16 | 1 | 4 | 1 | 1 | 101.000 |
| 17 | 1 | 1 | 4 | 1 | 101.000 |
| 18 | 1 | 1 | 1 | 4 | 101.000 |
| 19 | 3 | 2 | 1 | 1 | 103.000 |

-continued

| | | | | | |
|---|---|---|---|---|---|
| 20 | 3 | 1 | 2 | 1 | 103.000 |
| 21 | 3 | 1 | 1 | 2 | 103.000 |
| 22 | 2 | 3 | 1 | 1 | 103.000 |
| 23 | 2 | 1 | 3 | 1 | 103.000 |
| 24 | 2 | 1 | 1 | 3 | 103.000 |
| 25 | 1 | 3 | 2 | 1 | 103.000 |
| 26 | 1 | 3 | 1 | 2 | 103.000 |
| 27 | 1 | 2 | 3 | 1 | 103.000 |
| 28 | 1 | 2 | 1 | 3 | 103.000 |
| 29 | 1 | 1 | 3 | 2 | 103.000 |
| 30 | 1 | 1 | 2 | 3 | 103.000 |
| 31 | 2 | 2 | 2 | 1 | 106.000 |
| 32 | 2 | 2 | 1 | 2 | 106.000 |
| 33 | 2 | 1 | 2 | 2 | 106.000 |
| 34 | 1 | 2 | 2 | 2 | 106.000 |
| 35 | 5 | 1 | 1 | 1 | 120.500 |
| 36 | 1 | 5 | 1 | 1 | 120.500 |
| 37 | 1 | 1 | 5 | 1 | 120.500 |
| 38 | 1 | 1 | 1 | 5 | 120.500 |
| 39 | 3 | 3 | 1 | 1 | 122.000 |
| 40 | 3 | 1 | 3 | 1 | 122.000 |
| 41 | 3 | 1 | 1 | 3 | 122.000 |
| 42 | 1 | 3 | 3 | 1 | 122.000 |
| 43 | 1 | 3 | 1 | 3 | 122.000 |
| 44 | 1 | 1 | 3 | 3 | 122.000 |
| 45 | 4 | 2 | 1 | 1 | 123.000 |
| 46 | 4 | 1 | 2 | 1 | 123.000 |
| 47 | 4 | 1 | 1 | 2 | 123.000 |
| 48 | 2 | 4 | 1 | 1 | 123.000 |
| 49 | 2 | 1 | 4 | 1 | 123.000 |
| 50 | 2 | 1 | 1 | 4 | 123.000 |
| 51 | 1 | 4 | 2 | 1 | 123.000 |
| 52 | 1 | 4 | 1 | 2 | 123.000 |
| 53 | 1 | 2 | 4 | 1 | 123.000 |
| 54 | 1 | 2 | 1 | 4 | 123.000 |
| 55 | 1 | 1 | 4 | 2 | 123.000 |
| 56 | 1 | 1 | 2 | 4 | 123.000 |
| 57 | 3 | 2 | 2 | 1 | 125.000 |
| 58 | 3 | 2 | 1 | 2 | 125.000 |
| 59 | 3 | 1 | 2 | 2 | 125.000 |
| 60 | 2 | 3 | 2 | 1 | 125.000 |
| 61 | 2 | 3 | 1 | 2 | 125.000 |
| 62 | 2 | 2 | 3 | 1 | 125.000 |
| 63 | 2 | 2 | 1 | 3 | 125.000 |
| 64 | 2 | 1 | 3 | 2 | 125.000 |
| 65 | 2 | 1 | 2 | 3 | 125.000 |
| 66 | 1 | 3 | 2 | 2 | 125.000 |
| 67 | 1 | 2 | 3 | 2 | 125.000 |
| 68 | 1 | 2 | 2 | 3 | 125.000 |
| 69 | 2 | 2 | 2 | 2 | 128.000 |
| 70 | 4 | 3 | 1 | 1 | 142.000 |
| 71 | 4 | 1 | 3 | 1 | 142.000 |
| 72 | 4 | 1 | 1 | 3 | 142.000 |
| 73 | 3 | 4 | 1 | 1 | 142.000 |
| 74 | 3 | 1 | 4 | 1 | 142.000 |
| 75 | 3 | 1 | 1 | 4 | 142.000 |
| 76 | 1 | 4 | 3 | 1 | 142.000 |
| 77 | 1 | 4 | 1 | 3 | 142.000 |
| 78 | 1 | 3 | 4 | 1 | 142.000 |
| 79 | 1 | 3 | 1 | 4 | 142.000 |
| 80 | 1 | 1 | 4 | 3 | 142.000 |
| 81 | 1 | 1 | 3 | 4 | 142.000 |
| 82 | 5 | 2 | 1 | 1 | 142.500 |
| 83 | 5 | 1 | 2 | 1 | 142.500 |
| 84 | 5 | 1 | 1 | 2 | 142.500 |
| 85 | 2 | 5 | 1 | 1 | 142.500 |
| 86 | 2 | 1 | 5 | 1 | 142.500 |
| 87 | 2 | 1 | 1 | 5 | 142.500 |
| 88 | 1 | 5 | 2 | 1 | 142.500 |
| 89 | 1 | 5 | 1 | 2 | 142.500 |
| 90 | 1 | 2 | 5 | 1 | 142.500 |
| 91 | 1 | 2 | 1 | 5 | 142.500 |
| 92 | 1 | 1 | 5 | 2 | 142.500 |
| 93 | 1 | 1 | 2 | 5 | 142.500 |
| 94 | 3 | 3 | 2 | 1 | 144.000 |
| 95 | 3 | 3 | 1 | 2 | 144.000 |
| 96 | 3 | 2 | 3 | 1 | 144.000 |
| 97 | 3 | 2 | 1 | 3 | 144.000 |
| 98 | 3 | 1 | 3 | 2 | 144.000 |
| 99 | 3 | 1 | 2 | 3 | 144.000 |
| 100 | 2 | 3 | 3 | 1 | 144.000 |
| 101 | 2 | 3 | 1 | 3 | 144.000 |
| 102 | 2 | 1 | 3 | 3 | 144.000 |
| 103 | 1 | 3 | 3 | 2 | 144.000 |
| 104 | 1 | 3 | 2 | 3 | 144.000 |
| 105 | 1 | 2 | 3 | 3 | 144.000 |
| 106 | 4 | 2 | 2 | 1 | 145.000 |
| 107 | 4 | 2 | 1 | 2 | 145.000 |
| 108 | 4 | 1 | 2 | 2 | 145.000 |
| 109 | 2 | 4 | 2 | 1 | 145.000 |
| 110 | 2 | 4 | 1 | 2 | 145.000 |
| 111 | 2 | 2 | 4 | 1 | 145.000 |
| 112 | 2 | 2 | 1 | 4 | 145.000 |
| 113 | 2 | 1 | 4 | 2 | 145.000 |
| 114 | 2 | 1 | 2 | 4 | 145.000 |
| 115 | 1 | 4 | 2 | 2 | 145.000 |
| 116 | 1 | 2 | 4 | 2 | 145.000 |
| 117 | 1 | 2 | 2 | 4 | 145.000 |
| 118 | 3 | 2 | 2 | 2 | 147.000 |
| 119 | 2 | 3 | 2 | 2 | 147.000 |
| 120 | 2 | 2 | 3 | 2 | 147.000 |
| 121 | 2 | 2 | 2 | 3 | 147.000 |
| 122 | 5 | 3 | 1 | 1 | 161.500 |
| 123 | 5 | 1 | 3 | 1 | 161.500 |
| 124 | 5 | 1 | 1 | 3 | 161.500 |
| 125 | 5 | 1 | 1 | 1 | 161.500 |
| 126 | 3 | 1 | 5 | 1 | 161.500 |
| 127 | 3 | 1 | 1 | 5 | 161.500 |
| 128 | 1 | 5 | 3 | 1 | 161.500 |
| 129 | 1 | 5 | 1 | 3 | 161.500 |
| 130 | 1 | 3 | 5 | 1 | 161.500 |
| 131 | 1 | 3 | 1 | 5 | 161.500 |
| 132 | 1 | 1 | 5 | 3 | 161.500 |
| 133 | 1 | 1 | 3 | 5 | 161.500 |
| 134 | 4 | 4 | 1 | 1 | 162.000 |
| 135 | 4 | 1 | 4 | 1 | 162.000 |
| 136 | 4 | 1 | 1 | 4 | 162.000 |
| 137 | 1 | 4 | 4 | 1 | 162.000 |
| 138 | 1 | 4 | 1 | 4 | 162.000 |
| 139 | 1 | 1 | 4 | 4 | 162.000 |
| 140 | 3 | 3 | 3 | 1 | 163.000 |
| 141 | 3 | 3 | 1 | 3 | 163.000 |
| 142 | 3 | 1 | 3 | 3 | 163.000 |
| 143 | 1 | 3 | 3 | 3 | 163.000 |
| 144 | 4 | 3 | 2 | 1 | 164.000 |
| 145 | 4 | 3 | 1 | 2 | 164.000 |
| 146 | 4 | 2 | 3 | 1 | 164.000 |
| 147 | 4 | 2 | 1 | 3 | 164.000 |
| 148 | 4 | 1 | 3 | 2 | 164.000 |
| 149 | 4 | 1 | 2 | 3 | 164.000 |
| 150 | 3 | 4 | 2 | 1 | 164.000 |
| 151 | 3 | 4 | 1 | 2 | 164.000 |
| 152 | 3 | 2 | 4 | 1 | 164.000 |
| 153 | 3 | 2 | 1 | 4 | 164.000 |
| 154 | 3 | 1 | 4 | 2 | 164.000 |
| 155 | 3 | 1 | 2 | 4 | 164.000 |
| 156 | 2 | 4 | 3 | 1 | 164.000 |
| 157 | 2 | 4 | 1 | 3 | 164.000 |
| 158 | 2 | 3 | 4 | 1 | 164.000 |
| 159 | 2 | 3 | 1 | 4 | 164.000 |
| 160 | 2 | 1 | 4 | 3 | 164.000 |
| 161 | 2 | 1 | 3 | 4 | 164.000 |
| 162 | 1 | 4 | 3 | 2 | 164.000 |
| 163 | 1 | 4 | 2 | 3 | 164.000 |
| 164 | 1 | 3 | 4 | 2 | 164.000 |
| 165 | 1 | 3 | 2 | 4 | 164.000 |
| 166 | 1 | 2 | 4 | 3 | 164.000 |
| 167 | 1 | 2 | 3 | 4 | 164.000 |
| 168 | 5 | 2 | 2 | 1 | 164.500 |
| 169 | 5 | 2 | 1 | 2 | 164.500 |
| 170 | 5 | 1 | 2 | 2 | 164.500 |
| 171 | 2 | 5 | 2 | 1 | 164.500 |
| 172 | 2 | 5 | 1 | 2 | 164.500 |
| 173 | 2 | 2 | 5 | 1 | 164.500 |
| 174 | 2 | 2 | 1 | 5 | 164.500 |
| 175 | 2 | 1 | 5 | 2 | 164.500 |
| 176 | 2 | 1 | 2 | 5 | 164.500 |
| 177 | 1 | 5 | 2 | 2 | 164.500 |
| 178 | 1 | 2 | 5 | 2 | 164.500 |
| 179 | 1 | 2 | 2 | 5 | 164.500 |
| 180 | 3 | 3 | 2 | 2 | 166.000 |
| 181 | 3 | 2 | 3 | 2 | 166.000 |
| 182 | 3 | 2 | 2 | 3 | 166.000 |
| 183 | 2 | 3 | 3 | 2 | 166.000 |

| | | | | | |
|---|---|---|---|---|---|
| 184 | 2 | 3 | 2 | 3 | 166.000 |
| 185 | 2 | 2 | 3 | 3 | 166.000 |
| 186 | 4 | 2 | 2 | 2 | 167.000 |
| 187 | 2 | 4 | 2 | 2 | 167.000 |
| 188 | 2 | 2 | 4 | 2 | 167.000 |
| 189 | 2 | 2 | 2 | 4 | 167.000 |
| 190 | 5 | 4 | 1 | 1 | 181.500 |
| 191 | 5 | 1 | 4 | 1 | 181.500 |
| 192 | 5 | 1 | 1 | 4 | 181.500 |
| 193 | 4 | 5 | 1 | 1 | 181.500 |
| 194 | 4 | 1 | 5 | 1 | 181.500 |
| 195 | 4 | 1 | 1 | 5 | 181.500 |
| 196 | 1 | 5 | 4 | 1 | 181.500 |
| 197 | 1 | 5 | 1 | 4 | 181.500 |
| 198 | 1 | 4 | 5 | 1 | 181.500 |
| 199 | 1 | 4 | 1 | 5 | 181.500 |
| 200 | 1 | 1 | 5 | 4 | 181.500 |
| 201 | 1 | 1 | 4 | 5 | 181.500 |
| 202 | 4 | 3 | 3 | 1 | 183.000 |
| 203 | 4 | 3 | 1 | 3 | 183.000 |
| 204 | 4 | 1 | 3 | 3 | 183.000 |
| 205 | 3 | 4 | 3 | 1 | 183.000 |
| 206 | 3 | 4 | 1 | 3 | 183.000 |
| 207 | 3 | 3 | 4 | 1 | 183.000 |
| 208 | 3 | 3 | 1 | 4 | 183.000 |
| 209 | 3 | 1 | 4 | 3 | 183.000 |
| 210 | 3 | 1 | 3 | 4 | 183.000 |
| 211 | 1 | 4 | 3 | 3 | 183.000 |
| 212 | 1 | 3 | 4 | 3 | 183.000 |
| 213 | 1 | 3 | 3 | 4 | 183.000 |
| 214 | 5 | 3 | 2 | 1 | 183.500 |
| 215 | 5 | 3 | 1 | 2 | 183.500 |
| 216 | 5 | 2 | 3 | 1 | 183.500 |
| 217 | 5 | 2 | 1 | 3 | 183.500 |
| 218 | 5 | 1 | 3 | 2 | 183.500 |
| 219 | 5 | 1 | 2 | 3 | 183.500 |
| 220 | 3 | 5 | 2 | 1 | 183.500 |
| 221 | 3 | 5 | 1 | 2 | 183.500 |
| 222 | 3 | 2 | 5 | 1 | 183.500 |
| 223 | 3 | 2 | 1 | 5 | 183.500 |
| 224 | 3 | 1 | 5 | 2 | 183.500 |
| 225 | 3 | 1 | 2 | 5 | 183.500 |
| 226 | 2 | 5 | 3 | 1 | 183.500 |
| 227 | 2 | 5 | 1 | 3 | 183.500 |
| 228 | 2 | 3 | 5 | 1 | 183.500 |
| 229 | 2 | 3 | 1 | 5 | 183.500 |
| 230 | 2 | 1 | 5 | 3 | 183.500 |
| 231 | 2 | 1 | 3 | 5 | 183.500 |
| 232 | 1 | 5 | 3 | 2 | 183.500 |
| 233 | 1 | 5 | 2 | 3 | 183.500 |
| 234 | 1 | 3 | 5 | 2 | 183.500 |
| 235 | 1 | 3 | 2 | 5 | 183.500 |
| 236 | 1 | 2 | 5 | 3 | 183.500 |
| 237 | 1 | 2 | 3 | 5 | 183.500 |
| 238 | 4 | 4 | 2 | 1 | 184.000 |
| 239 | 4 | 4 | 1 | 2 | 184.000 |
| 240 | 4 | 2 | 4 | 1 | 184.000 |
| 241 | 4 | 2 | 1 | 4 | 184.000 |
| 242 | 4 | 1 | 4 | 2 | 184.000 |
| 243 | 4 | 1 | 2 | 4 | 184.000 |
| 244 | 2 | 4 | 4 | 1 | 184.000 |
| 245 | 2 | 4 | 1 | 4 | 184.000 |
| 246 | 2 | 1 | 4 | 4 | 184.000 |
| 247 | 1 | 4 | 4 | 2 | 184.000 |
| 248 | 1 | 4 | 2 | 4 | 184.000 |
| 249 | 1 | 2 | 4 | 4 | 184.000 |
| 250 | 3 | 3 | 3 | 2 | 185.000 |
| 251 | 3 | 3 | 2 | 3 | 185.000 |
| 252 | 3 | 2 | 3 | 3 | 185.000 |
| 253 | 2 | 3 | 3 | 3 | 185.000 |
| 254 | 4 | 3 | 2 | 2 | 186.000 |
| 255 | 4 | 2 | 3 | 2 | 186.000 |
| 256 | 4 | 2 | 2 | 3 | 186.000 |
| 257 | 3 | 4 | 2 | 2 | 186.000 |
| 258 | 3 | 2 | 4 | 2 | 186.000 |
| 259 | 3 | 2 | 2 | 4 | 186.000 |
| 260 | 2 | 4 | 3 | 2 | 186.000 |
| 261 | 2 | 4 | 2 | 3 | 186.000 |
| 262 | 2 | 3 | 4 | 2 | 186.000 |
| 263 | 2 | 3 | 2 | 4 | 186.000 |
| 264 | 2 | 2 | 4 | 3 | 186.000 |
| 265 | 2 | 2 | 3 | 4 | 186.000 |
| 266 | 5 | 2 | 2 | 2 | 186.500 |
| 267 | 2 | 5 | 2 | 2 | 186.500 |
| 268 | 2 | 2 | 5 | 2 | 186.500 |
| 269 | 2 | 2 | 2 | 5 | 186.500 |
| 270 | 5 | 5 | 1 | 1 | 201.000 |
| 271 | 5 | 1 | 5 | 1 | 201.000 |
| 272 | 5 | 1 | 1 | 5 | 201.000 |
| 273 | 1 | 5 | 5 | 1 | 201.000 |
| 274 | 1 | 5 | 1 | 5 | 201.000 |
| 275 | 1 | 1 | 5 | 5 | 201.000 |
| 276 | 5 | 3 | 3 | 1 | 202.500 |
| 277 | 5 | 3 | 1 | 3 | 202.500 |
| 278 | 5 | 1 | 3 | 3 | 202.500 |
| 279 | 3 | 5 | 3 | 1 | 202.500 |
| 280 | 3 | 5 | 1 | 3 | 202.500 |
| 281 | 3 | 3 | 5 | 1 | 202.500 |
| 282 | 3 | 3 | 1 | 5 | 202.500 |
| 283 | 3 | 1 | 5 | 3 | 202.500 |
| 284 | 3 | 1 | 3 | 5 | 202.500 |
| 285 | 1 | 5 | 3 | 3 | 202.500 |
| 286 | 1 | 3 | 5 | 3 | 202.500 |
| 287 | 1 | 3 | 3 | 5 | 202.500 |
| 288 | 4 | 4 | 3 | 1 | 203.000 |
| 289 | 4 | 4 | 1 | 3 | 203.000 |
| 290 | 4 | 3 | 4 | 1 | 203.000 |
| 291 | 4 | 3 | 1 | 4 | 203.000 |
| 292 | 4 | 1 | 4 | 3 | 203.000 |
| 293 | 4 | 1 | 3 | 4 | 203.000 |
| 294 | 3 | 4 | 4 | 1 | 203.000 |
| 295 | 3 | 4 | 1 | 4 | 203.000 |
| 296 | 3 | 1 | 4 | 4 | 203.000 |
| 297 | 1 | 4 | 4 | 3 | 203.000 |
| 298 | 1 | 4 | 3 | 4 | 203.000 |
| 299 | 1 | 3 | 4 | 4 | 203.000 |
| 300 | 5 | 4 | 2 | 1 | 203.500 |
| 301 | 5 | 4 | 1 | 2 | 203.500 |
| 302 | 5 | 2 | 4 | 1 | 203.500 |
| 303 | 5 | 2 | 1 | 4 | 203.500 |
| 304 | 5 | 1 | 4 | 2 | 203.500 |
| 305 | 5 | 1 | 2 | 4 | 203.500 |
| 306 | 4 | 5 | 2 | 1 | 203.500 |
| 307 | 4 | 5 | 1 | 2 | 203.500 |
| 308 | 4 | 2 | 5 | 1 | 203.500 |
| 309 | 4 | 2 | 1 | 5 | 203.500 |
| 310 | 4 | 1 | 5 | 2 | 203.500 |
| 311 | 4 | 1 | 2 | 5 | 203.500 |
| 312 | 2 | 5 | 4 | 1 | 203.500 |
| 313 | 2 | 5 | 1 | 4 | 203.500 |
| 314 | 2 | 4 | 5 | 1 | 203.500 |
| 315 | 2 | 4 | 1 | 5 | 203.500 |
| 316 | 2 | 1 | 5 | 4 | 203.500 |
| 317 | 2 | 1 | 4 | 5 | 203.500 |
| 318 | 1 | 5 | 4 | 2 | 203.500 |
| 319 | 1 | 5 | 2 | 4 | 203.500 |
| 320 | 1 | 4 | 5 | 2 | 203.500 |
| 321 | 1 | 4 | 2 | 5 | 203.500 |
| 322 | 1 | 2 | 5 | 4 | 203.500 |
| 323 | 1 | 2 | 4 | 5 | 203.500 |
| 324 | 3 | 3 | 3 | 3 | 204.000 |
| 325 | 4 | 3 | 3 | 2 | 205.000 |
| 326 | 4 | 3 | 2 | 3 | 205.000 |
| 327 | 4 | 2 | 3 | 3 | 205.000 |
| 328 | 3 | 4 | 3 | 2 | 205.000 |
| 329 | 3 | 4 | 2 | 3 | 205.000 |
| 330 | 3 | 3 | 4 | 2 | 205.000 |
| 331 | 3 | 3 | 2 | 4 | 205.000 |
| 332 | 3 | 2 | 4 | 3 | 205.000 |
| 333 | 3 | 2 | 3 | 4 | 205.000 |
| 334 | 2 | 4 | 3 | 3 | 205.000 |
| 335 | 2 | 3 | 4 | 3 | 205.000 |
| 336 | 2 | 3 | 3 | 4 | 205.000 |
| 337 | 5 | 3 | 2 | 2 | 205.500 |
| 338 | 5 | 2 | 3 | 2 | 205.500 |
| 339 | 5 | 2 | 2 | 3 | 205.500 |
| 340 | 3 | 5 | 2 | 2 | 205.500 |
| 341 | 3 | 2 | 5 | 2 | 205.500 |
| 342 | 3 | 2 | 2 | 5 | 205.500 |
| 343 | 2 | 5 | 3 | 2 | 205.500 |
| 344 | 2 | 5 | 2 | 3 | 205.500 |
| 345 | 2 | 3 | 5 | 2 | 205.500 |
| 346 | 2 | 3 | 2 | 5 | 205.500 |
| 347 | 2 | 2 | 5 | 3 | 205.500 |

-continued

| | | | | | |
|---|---|---|---|---|---|
| 348 | 2 | 2 | 3 | 5 | 205.500 |
| 349 | 4 | 4 | 2 | 2 | 206.000 |
| 350 | 4 | 2 | 4 | 2 | 206.000 |
| 351 | 4 | 2 | 2 | 4 | 206.000 |
| 352 | 2 | 4 | 4 | 2 | 206.000 |
| 353 | 2 | 4 | 2 | 4 | 206.000 |
| 354 | 2 | 2 | 4 | 4 | 206.000 |
| 355 | 5 | 4 | 3 | 1 | 222.500 |
| 356 | 5 | 4 | 1 | 3 | 222.500 |
| 357 | 5 | 3 | 4 | 1 | 222.500 |
| 358 | 5 | 3 | 1 | 4 | 222.500 |
| 359 | 5 | 1 | 4 | 3 | 222.500 |
| 360 | 5 | 1 | 3 | 4 | 222.500 |
| 361 | 4 | 5 | 3 | 1 | 222.500 |
| 362 | 4 | 5 | 1 | 3 | 222.500 |
| 363 | 4 | 3 | 5 | 1 | 222.500 |
| 364 | 4 | 3 | 1 | 5 | 222.500 |
| 365 | 4 | 1 | 5 | 3 | 222.500 |
| 366 | 4 | 1 | 3 | 5 | 222.500 |
| 367 | 3 | 5 | 4 | 1 | 222.500 |
| 368 | 3 | 5 | 1 | 4 | 222.500 |
| 369 | 3 | 4 | 5 | 1 | 222.500 |
| 370 | 3 | 4 | 1 | 5 | 222.500 |
| 371 | 3 | 1 | 5 | 4 | 222.500 |
| 372 | 3 | 1 | 4 | 5 | 222.500 |
| 373 | 1 | 5 | 4 | 3 | 222.500 |
| 374 | 1 | 5 | 3 | 4 | 222.500 |
| 375 | 1 | 4 | 5 | 3 | 222.500 |
| 376 | 1 | 4 | 3 | 5 | 222.500 |
| 377 | 1 | 3 | 5 | 4 | 222.500 |
| 378 | 1 | 3 | 4 | 5 | 222.500 |
| 379 | 5 | 5 | 2 | 1 | 223.000 |
| 380 | 5 | 5 | 1 | 2 | 223.000 |
| 381 | 5 | 2 | 5 | 1 | 223.000 |
| 382 | 5 | 2 | 1 | 5 | 223.000 |
| 383 | 5 | 1 | 5 | 2 | 223.000 |
| 384 | 5 | 1 | 2 | 5 | 223.000 |
| 385 | 4 | 4 | 4 | 1 | 223.000 |
| 386 | 4 | 4 | 1 | 4 | 223.000 |
| 387 | 4 | 1 | 4 | 4 | 223.000 |
| 388 | 2 | 5 | 5 | 1 | 223.000 |
| 289 | 2 | 5 | 1 | 5 | 223.000 |
| 390 | 2 | 1 | 5 | 5 | 223.000 |
| 391 | 1 | 5 | 5 | 2 | 223.000 |
| 392 | 1 | 5 | 2 | 5 | 223.000 |
| 393 | 1 | 4 | 4 | 4 | 223.000 |
| 394 | 1 | 2 | 5 | 5 | 223.000 |
| 395 | 4 | 3 | 3 | 3 | 224.000 |
| 396 | 3 | 4 | 3 | 3 | 224.000 |
| 397 | 3 | 3 | 4 | 3 | 224.000 |
| 398 | 3 | 3 | 3 | 4 | 224.000 |
| 399 | 5 | 3 | 3 | 2 | 224.500 |
| 400 | 5 | 3 | 2 | 3 | 224.500 |
| 401 | 5 | 2 | 3 | 3 | 224.500 |
| 402 | 3 | 5 | 3 | 2 | 224.500 |
| 403 | 3 | 5 | 2 | 3 | 224.500 |
| 404 | 3 | 3 | 5 | 2 | 224.500 |
| 405 | 3 | 3 | 2 | 5 | 224.500 |
| 406 | 3 | 2 | 5 | 3 | 224.500 |
| 407 | 3 | 2 | 3 | 5 | 224.500 |
| 408 | 2 | 5 | 3 | 3 | 224.500 |
| 409 | 2 | 3 | 5 | 3 | 224.500 |
| 410 | 2 | 3 | 3 | 5 | 224.500 |
| 411 | 4 | 4 | 3 | 2 | 225.000 |
| 412 | 4 | 4 | 2 | 3 | 225.000 |
| 413 | 4 | 3 | 4 | 2 | 225.000 |
| 414 | 4 | 3 | 2 | 4 | 225.000 |
| 415 | 4 | 2 | 4 | 3 | 225.000 |
| 416 | 4 | 2 | 3 | 4 | 225.000 |
| 417 | 3 | 4 | 4 | 2 | 225.000 |
| 418 | 3 | 4 | 2 | 4 | 225.000 |
| 419 | 3 | 2 | 4 | 4 | 225.000 |
| 420 | 2 | 4 | 4 | 3 | 225.000 |
| 421 | 2 | 4 | 3 | 4 | 225.000 |
| 422 | 2 | 3 | 4 | 4 | 225.000 |
| 423 | 5 | 4 | 2 | 2 | 225.500 |
| 424 | 5 | 2 | 4 | 2 | 225.500 |
| 425 | 5 | 2 | 2 | 4 | 225.500 |
| 426 | 4 | 5 | 2 | 2 | 225.500 |
| 427 | 4 | 2 | 5 | 2 | 225.500 |
| 428 | 4 | 2 | 2 | 5 | 225.500 |
| 429 | 2 | 5 | 4 | 2 | 225.500 |
| 430 | 2 | 5 | 2 | 4 | 225.500 |
| 431 | 2 | 4 | 5 | 2 | 225.500 |
| 432 | 2 | 4 | 2 | 5 | 225.500 |
| 433 | 2 | 2 | 5 | 4 | 225.500 |
| 434 | 2 | 2 | 4 | 5 | 225.500 |
| 435 | 5 | 5 | 3 | 1 | 242.000 |
| 436 | 5 | 5 | 1 | 3 | 242.000 |
| 437 | 5 | 3 | 5 | 1 | 242.000 |
| 438 | 5 | 3 | 1 | 5 | 242.000 |
| 439 | 5 | 1 | 5 | 3 | 242.000 |
| 449 | 5 | 1 | 3 | 5 | 242.000 |
| 441 | 3 | 5 | 5 | 1 | 242.000 |
| 442 | 3 | 5 | 1 | 5 | 242.000 |
| 443 | 3 | 1 | 5 | 5 | 242.000 |
| 444 | 1 | 5 | 5 | 3 | 242.000 |
| 445 | 1 | 5 | 3 | 5 | 242.000 |
| 446 | 1 | 3 | 5 | 5 | 242.000 |
| 447 | 5 | 4 | 4 | 1 | 242.500 |
| 448 | 5 | 4 | 1 | 4 | 242.500 |
| 449 | 5 | 1 | 4 | 4 | 242.500 |
| 450 | 4 | 5 | 4 | 1 | 242.500 |
| 451 | 4 | 5 | 1 | 4 | 242.500 |
| 452 | 4 | 4 | 5 | 1 | 242.500 |
| 453 | 4 | 4 | 1 | 5 | 242.500 |
| 454 | 4 | 1 | 5 | 4 | 242.500 |
| 455 | 4 | 1 | 4 | 5 | 242.500 |
| 456 | 1 | 5 | 4 | 4 | 242.500 |
| 457 | 1 | 4 | 5 | 4 | 242.500 |
| 458 | 1 | 4 | 4 | 5 | 242.500 |
| 459 | 5 | 3 | 3 | 3 | 243.500 |
| 460 | 3 | 5 | 3 | 3 | 243.500 |
| 461 | 3 | 3 | 5 | 3 | 243.500 |
| 462 | 3 | 3 | 3 | 5 | 243.500 |
| 463 | 4 | 4 | 3 | 3 | 244.000 |
| 464 | 4 | 3 | 4 | 3 | 244.000 |
| 465 | 4 | 3 | 3 | 4 | 244.000 |
| 466 | 3 | 4 | 4 | 3 | 244.000 |
| 467 | 3 | 4 | 3 | 4 | 244.000 |
| 468 | 3 | 3 | 4 | 4 | 244.000 |
| 469 | 5 | 4 | 3 | 2 | 244.500 |
| 470 | 5 | 4 | 2 | 3 | 244.500 |
| 471 | 5 | 3 | 4 | 2 | 244.500 |
| 472 | 5 | 3 | 2 | 4 | 244.500 |
| 473 | 5 | 2 | 4 | 3 | 244.500 |
| 474 | 5 | 2 | 3 | 4 | 244.500 |
| 475 | 4 | 5 | 3 | 2 | 244.500 |
| 476 | 4 | 5 | 2 | 3 | 244.500 |
| 477 | 4 | 3 | 5 | 2 | 244.500 |
| 478 | 4 | 3 | 2 | 5 | 244.500 |
| 479 | 4 | 2 | 5 | 3 | 244.500 |
| 480 | 4 | 2 | 3 | 5 | 244.500 |
| 481 | 3 | 5 | 4 | 2 | 244.500 |
| 482 | 3 | 5 | 2 | 4 | 244.500 |
| 483 | 3 | 4 | 5 | 2 | 244.500 |
| 484 | 3 | 4 | 2 | 5 | 244.500 |
| 485 | 3 | 2 | 5 | 4 | 244.500 |
| 486 | 3 | 2 | 4 | 5 | 244.500 |
| 487 | 2 | 5 | 4 | 3 | 244.500 |
| 488 | 2 | 5 | 3 | 4 | 244.500 |
| 489 | 2 | 4 | 5 | 3 | 244.500 |
| 490 | 2 | 4 | 3 | 5 | 244.500 |
| 491 | 2 | 3 | 5 | 4 | 244.500 |
| 492 | 2 | 3 | 4 | 5 | 244.500 |
| 493 | 5 | 5 | 2 | 2 | 245.000 |
| 494 | 5 | 2 | 5 | 2 | 245.000 |
| 495 | 5 | 2 | 2 | 5 | 245.000 |
| 496 | 4 | 4 | 4 | 2 | 245.000 |
| 497 | 4 | 4 | 2 | 4 | 245.000 |
| 498 | 4 | 2 | 4 | 4 | 245.000 |
| 499 | 2 | 5 | 5 | 2 | 245.000 |
| 500 | 2 | 5 | 2 | 5 | 245.000 |
| 501 | 2 | 4 | 4 | 4 | 245.000 |
| 502 | 2 | 2 | 5 | 5 | 245.000 |
| 503 | 5 | 4 | 1 | 5 | 262.000 |
| 504 | 5 | 1 | 5 | 4 | 262.000 |
| 505 | 5 | 1 | 4 | 5 | 262.000 |
| 506 | 4 | 5 | 5 | 1 | 262.000 |
| 507 | 4 | 5 | 1 | 5 | 262.000 |
| 508 | 4 | 1 | 5 | 5 | 262.000 |
| 509 | 1 | 5 | 5 | 4 | 262.000 |
| 510 | 1 | 5 | 4 | 5 | 262.000 |
| 511 | 1 | 4 | 5 | 5 | 262.000 |

-continued

```
sum . avep    94962.0000000    185.4726563
```

As aforementioned with reference to FIG. 1, four 2D points (coordinate pairs) which represent an 8D point of the preferred 8D constellation are generated by a mapper 30 from twenty-nine input bits. The twenty-nine bits input into the mapper define the 8D point in the following manner. Nine bits of the twenty-nine bits are used to identify in which the of the five hundred twelve lowest energy 8D groupings the 8D point lies. The identified grouping provides a determined "ring" in each of the four 2D constellations. Then, eight additional bits of the twenty-nine bits (i.e. those eight bits which are generated by the differential encoder, convolutional encoder, and bit converter) are used to identify in which subgroups of the identified 8D grouping the 8D point lies. In other words, for each identified "ring", two bits are used to identify one of the four rotational subgroups, such that the 8D point is comprised of one of eight points in each 2D constellation. Then, the remaining twelve bits of the twenty-nine bits are used to identify among the points of the identified subgroups. In other words, three bits for each 2D constellation are utilized to choose among the eight remaining possible points of that 2D constellation.

It should be appreciated that the mapping technique described herein can be extended. Instead of dividing each one hundred sixty point 2D constellation into five rings of thirty-two points, the 2D constellations can each be divided into ten distinct energy rings of sixteen points each, with each ring of sixteen points being further divided into its four constituent rotational subgroups of four points each. With such an arrangement, the eight thousand one hundred ninety-six ($2^{13}$) lowest energy groupings would be chosen from the ten thousand ($10^4$) possible groupings to comprise the constellation. An 8D point would be chosen from the defined constellation by using thirteen bits to choose the grouping, eight bits to define the rotational subgroups, and the remaining eight bits (two per 2D constellation) to define the point.

While an extension of the mapping technique from five rings to ten rings does provide a slight additional signal/noise improvement, the additional memory and processor requirements currently well outweigh the advantages. Similarly, further extensions to twenty rings, etc. would result in yet smaller gain at the expense of yet additional memory and processor costs.

There has been described and illustrated herein a technique for mapping all points of an eight dimensional constellation of a convolutionally coded 19.2 Kbit/sec modem. While particular embodiments have been described, it is not intended that the invention be limited thereto, as it is intended that the invention be broad in scope as the art will allow. Thus, while the mapping technique was described with reference to a particular 19.2 Kbit/second modem which utilizes a differential encoder and a sixty-four state convolutional encoder, it will be recognized that the mapping technique has application to modems having different arrangements. Also, while the mapping technique was described with reference to an 8D constellation comprised of four 160 point constellations, it will be appreciated that mapping technique equally applies to constellations of four or more dimensions (i.e. 4+2y dimensions where y is a non-negative integer) having particular numbers of points, provided that: a) the 2D constellation can be divided into an integer number (n) of groups having the same number of points, where the number of points is $2^r$, where r>2 and n>2; and b) the groupings is greater than $2^{z-2r-ry}$ where z is the number of bits available for defining the points of the 4+2y dimensional the constellation, and where z-2r-ry is the number of bits allocated to choosing a grouping. For example, an 8D constellation (y=2) comprised of a subset of points from four 2D constellations having one hundred forty-four points each could be divided into nine rings (n=9) of sixteen points (r=4) each. In such a situation, six thousand five hundred sixty-one ($9^4$) groupings would be available. If twenty-eight bits were available for picking a point (z=28) twelve bits (12=28-8-8) would be assigned to picking one of the four thousand ninety-six lowest energy groupings, eight bits would be assigned to picking the proper subgroup rotations, and eight bits would be assigned to picking the particular point. Similarly, if a 10D constellation (y=3) comprised of a subset of points from five 2D constellations having one hundred twelve points each could be divided into seven rings (n=7) of sixteen points each (r=4). If thirty-five bits were available for picking a point (z=35), fifteen bits (15=35-8-12) would be assigned to picking sixteen thousand three hundred eight-four of the sixteen thousand eight hundred and seven ($7^5$) 10D groupings, ten bits would be assigned to picking the proper subgroup rotations, and ten bits would be assigned to picking the particular point. Therefore, it will be appreciated by those skilled in the art that yet other modifications could be made to the provided invention without deviating from its spirit and scope as so claimed.

I claim:

1. A mapping technique utilizing twenty-nine bits for defining all points of an eight dimensional constellation, the eight dimensional constellation comprised of a desired subset of the concatenation of four two dimensional constellations, each two dimensional constellation comprised of one hundred and sixty points, the mapping technique comprising
   a) dividing each two dimensional constellation into five groups of thirty-two points each, the five groups being chosen such that each is of substantially different average energy relative to the others, the concatenation of one of the five groups from each two dimensional constellation comprising an eight dimensional grouping;
   b) choosing from the possible six hundred twenty-five eight dimensional groupings, five hundred twelve eight dimensional groupings, said five hundred twelve eight dimensional groupings constituting said eight dimensional constellation;
   c) for each two dimensional constellation, partitioning each group of thirty-two points into four subgroups of eight points, three of the subgroups representing ninety, one hundred eighty, and two hundred seventy degree rotations of the first subgroup;
   d) choosing an eight-dimensional point in said eight dimensional constellation by,
      1) utilizing nine bits of said twenty-nine bits to identify in which of said five hundred twelve eight-dimensional groupings said eight dimensional point lies;
      2) utilizing eight additional bits of said twenty-nine bits, two for each two-dimensional constellation, to identify in which subgroups of the identified eight-dimensional grouping said eight-dimensional point lies;
3) utilizing the remaining twelve bits of said twenty-nine bits, three for each two-dimensional constellation, to identify among the points of said identified sub-groups said eight-dimensional point.

2. The mapping technique of claim 1, wherein:
said chosen five hundred twelve eight dimensional groupings are the five hundred twelve substantially lowest energy eight dimensional groupings of said six hundred twenty five eight dimensional groupings.

3. The mapping technique of claim 1, wherein:
said five groups of substantially different energy are chosen for each two-dimensional constellation by choosing for each two-dimensional constellation a first set of eight points of lowest energy which are not 90, 180, or 270 degree rotations of each other and using those eight points and their 90, 180, and 270 degree rotations as a first group, and then choosing from the remaining points a next set of eight points of lowest energy which are not 90, 180, or 270 degree rotations of each other and using those eight points and their 90, 180, and 270 degree rotations as a next group, and repeating the choosing from remaining points step until all five groups are chosen.

4. The mapping technique of claim 1, wherein:
said five groups of substantially different energy are chosen for each 2D constellation by dividing each 2D constellation geometrically so as to locate each group of points in five areas approximating five concentric rings around an origin.

5. The mapping technique of claim 2, wherein:
said five groups of substantially different energy are chosen for each 2D constellation by choosing for each 2D constellation a first set of eight points of lowest energy which are not 90, 180, or 270 degree rotations of each other and using those eight points and their 90, 180, and 270 degree rotations as a first group, and then choosing from the remaining points a next set of eight points of lowest energy which are not 90, 180, or 270 degree rotations of each other and using those eight points and their 90, 180, and 270 degree rotations as a next group, and repeating the choosing from remaining points step until all five groups are chosen.

6. The mapping technique of claim 2, wherein:
said five groups of substantially different energy are chosen for each two-dimensional constellation by dividing each two-dimensional constellation geometrically so as to locate each group of points in five areas approximating five concentric rings around an origin.

7. A mapping technique for defining with z bits all $p = 2^z$ points of a constellation having $4 + 2y$ dimensions where y is an non-negative integer, the constellation comprised of a desired subset of the concatenation of $2 + y$ 2D constellations, each 2D constellation comprised of $n(2^r)$ points, where n is an integer greater than two, r is an integer greater than two, and z is an integer, the mapping technique comprising:
a) dividing each 2D constellation into n groups of $2^r$ points each, the n groups being chosen such that each is of substantially different average energy relative to the others, the concatenation of one of the n groups from each 2D constellation comprising a $(4+2y)D$ grouping;
b) choosing $2^{z-2r-ry}(4+2y)D$ groupings of the possible $n^{(2+y)}(4+2y)D$ groupings, the union of said $2^{z-2r-ry}$ $(4+2y)D$ groupings constituting said constellation;
c) for each 2D constellation, partitioning each group of $2^r$ points into four subgroups of $2^{r-2}$ points, three of the subgroups representing ninety, one hundred eighty, and two hundred seventy degree rotations of the first subgroup;
d) choosing a $(4+2y)D$ point in said constellation by,
1) utilizing z-2r-ry bits of said z bits to identify in which of said $2^{z-2r-ry}$ $(4+2y)D$ groupings said $(4+2y)D$ point lies;
2) utilizing $2(2+y)$ additional bits of said z bits, two for each 2D constellation, to identify in which subgroups of the identified $(4+2y)D$ grouping said $(4+2y)D$ point lies;
3) utilizing $(r-2)(2+y)$ of said z bits, r-2 bits for each 2D constellation, to identify among the points of said identified $(4+2y)D$ subgroups the $(4+2y)D$ point being sent.

8. The mapping technique of claim 7, wherein:
said chosen $2^{z-2r-ry}$ groupings are the $2^{z-2r-ry}$ substantially lowest energy $(4+2y)D$ groupings of said $n^{(2+y)}(4+2y)D$ groupings.

9. The mapping technique of claim 8, wherein:
said n groups of substantially different energy are chosen for each 2D constellation by choosing for each 2D constellation a first set of $2^r/4$ points of lowest energy which are not ninety, one hundred eighty, or two hundred seventy degree rotations of each other and using those $2^r/4$ points and their ninety, one hundred eighty, and two hundred seventy degree rotations as a first group, and then choosing from the remaining points a next set of $2^r/4$ points of lowest energy which are not ninety, one hundred eighty, or two hundred seventy degree rotations of each other and using those $2^r/4$ points and their ninety, one hundred eighty, and two hundred seventy degree rotations as a next group, and repeating the choosing from remaining points step until all n groups are chosen.

10. The mapping technique of claim 8, wherein:
said n groups of substantially different energy are chosen for each 2D constellation by dividing each 2D constellation geometrically so as to locate each group of points in n areas approximating n concentric rings around an origin.

11. An apparatus for transmitting a system of 28 information bits by sending corresponding signals over a channel in 4 signaling slots, comprising:
(a) means for encoding at least some of the 28 information bits that appear during a block of said four signaling slots by adding one redundant bit, to form a set of 29 signal point selection bits for said block;
(b) means for selecting, for said set of 29 signal point selection bits, an 8D signal point drawn from an 8D constellation for said block, said 8D signal point selected for a particular said block being dependent on the 8D signal point selected for at least one other said block, said means for selecting being connected to be responsive to said means for encoding,
wherein said means for selecting includes a mapping means for establishing a correspondence between each possible combination of said 29 signal point selection bits and the coordinates of the 8D signal points in said 8D constellation, wherein said means for encoding and said means for selecting define a dividing of said 8constellation into five hundred twelve 8D groupings out of a possible six hundred twenty-five 8D groupings, each 8D grouping having at most $32^4$ points, each 8D grouping being a concatenation of four 2D groups, one from each of four 2D constellations, such that said 8D constellation is a subset of a concatenation of said four 2D constellations, wherein each 2D group is comprised of thirty-two 2D points of its respective 2D constellation, and each said 2D constellation is divided into five 2D groups, each 2D group having a substantially different average energy relative to the others, wherein said means for encoding and said means for selecting further define a dividing of each of said five hundred twelve 8D groupings into four subgroups of at most eight points. three of the subgroups representing ninety, one hundred eighty, and two hundred seventy degree rotations of the first subgroup; and (c) means for modulating at least one carrier for transmission over said channel in accordance with the coordinates represented by each selected said 8D signal point, said means for modulating being connected to be responsive to said means for encoding.

12. An apparatus according to claim 11, wherein:

said five hundred twelve 8D groupings are the five hundred twelve substantially lowest energy 8D groupings available.

* * * * *